US006354507B1

(12) United States Patent
Maeda et al.

(10) Patent No.: US 6,354,507 B1
(45) Date of Patent: Mar. 12, 2002

(54) PAPER SHEET DISCRIMINATING APPARATUS AND METHOD

(75) Inventors: Shinichi Maeda; Norio Morikawa; Masatoshi Koga, all of Hyogo (JP)

(73) Assignee: Glory Ltd., Hyogo (JP)

( * ) Notice: Subject to any disclaimer, the term of this patent is extended or adjusted under 35 U.S.C. 154(b) by 0 days.

(21) Appl. No.: 09/665,798

(22) Filed: Sep. 20, 2000

(30) Foreign Application Priority Data

Oct. 4, 1999 (JP) .......................................... 11-282960

(51) Int. Cl.[7] ............................................... G06K 19/06
(52) U.S. Cl. ........................................ 235/494; 235/454
(58) Field of Search .................................. 235/494, 454

(56) References Cited

U.S. PATENT DOCUMENTS 6,095,425 A * 8/2000 Mowry, Jr. ................. 235/494

FOREIGN PATENT DOCUMENTS

| | | |
|---|---|---|
| EP | 0773511 | * 5/1997 |
| JP | 6-318245/1994 | 11/1994 |
| JP | 8-263718/1996 | 10/1996 |

* cited by examiner

*Primary Examiner*—Harold I. Pitts
(74) *Attorney, Agent, or Firm*—Ladas & Parry

(57) ABSTRACT

To provide a paper sheet discriminating apparatus and method capable of discriminating even a paper sheet such as a US dollar bill, in which the location of a pattern is dislocated from the periphery due to a printing shear or a cutting dislocation, efficiently without any drop of the discrimination percentage by using the image of the paper sheet. A paper sheet discriminating apparatus for deciding at least the kind of a paper sheet on the basis of its pattern by sampling the image of its whole surface. The dislocation of the pattern, as viewed from the contour, is detected on the basis of the marginal length of the paper sheet from the outer periphery to the pattern, thereby to correct a pixel position for providing a base point for the image recognition of the paper sheet, with the detected dislocation. Moreover, the difference of the marginal lengths is determined at the portion, where the channels at the identical position in the transfer direction and the lines in the transfer transverse direction are identical, to prevent an excessive correction by substituting a predetermined maximum when the difference is not less than a predetermined value, and to determine an average value by excluding the maximum and the minimum of the marginal lengths of a plurality of portions of each side.

10 Claims, 13 Drawing Sheets

| | START POINT | RETRIEVAL NUMBER |
|---|---|---|
| FRONT END PORTION | FP-1 | 5 |
| BACK END PORTION | BP | 5 |
| LEFT END PORTION | LP | 8 |
| RIGHT END PORTION | RP | 8 |

FIG. 9

ENUMERATED EXAMPLE

| | PORTION 1 | PORTION 2 | PORTION 3 | PORTION 4 | PORTION 5 | PORTION 6 |
|---|---|---|---|---|---|---|
| MARGINAL LENGTH OF FRONT END PORTION | 1 | 2 | 1 | 1 | 1 | 1 |
| MARGINAL LENGTH OF BACK END PORTION | 3 | 3 | 4 | 3 | 3 | 3 |
| FRONT AND BACK MARGINAL LENGTH DIFFERENCE | -2 | -1 | -3 | -2 | -2 | -2 |

FIG. 10

PAPER SHEET DISCRIMINATING APPARATUS AND METHOD

BACKGROUND OF THE INVENTION

1. Field of the Invention

The present invention relates to a paper sheet discriminating apparatus and method for deciding a kind and genuineness of a paper sheet such as a bill and, more particularly, to a paper sheet discriminating apparatus and method for discriminating a paper sheet such as a US dollar bill which may have a pattern (image) dislocated with respect to the contour.

2. Description of the Prior Art

FIG. 1 is a schematic diagram showing a relation of an example of the shape of a bill and an area to be discriminated. Generally, a bill 1 such as a Japanese bill has a fixed external shape or contour 1*a*, and this contour 1*a* and a pattern 1*b* have fixed locations. By using these fixed relations, the bill discriminating apparatus discriminates the bill 1 by blocking the image data in a discrimination area 2, as sampled from the external shape of the bill 1, to match the patterns.

When the paper sheet such as the bill being transferred is to be discriminated on its kind, genuineness, damage, breakage and so on by the paper sheet discriminating apparatus, the discrimination has to consider the "hiatus" due to the breakage or fold of the paper sheet or due to the "displacement" or the "oblique dislocation" to occur during the transfer.

A discrimination apparatus considering the chip due to the breakage or fold of the paper sheet is disclosed in Japanese Patent Application Laid-open No. 8-263718, for example. In this disclosed apparatus, the chipped portion, if any in the contour, of the paper sheet is complemented to a complete contour on the basis of a plurality of peripheral pixel data so that the pattern recognition is performed by blocking the complete contour. According to the above disclosure, the image data to be used for discriminating the paper sheet can restore those near the data before chipped, thus providing an effect that the misjudgment percentage can be lowered.

On the other hand, a discrimination apparatus considering the displacement and the oblique dislocation to occur in the paper sheet being transferred is disclosed in Japanese Patent Application Laid-open No. 6-318245, for example. In this disclosed apparatus, a line sensor is used to fetch the image data of the whole area of the paper sheet running at a high speed to write the detection time array (in which the time period for detecting the boundaries of the paper sheet and the background and the element numbers corresponding to the read pixel locations are made to correspond) in a buffer memory. Then, the gradient of the read image is corrected by oblique correction means, and the four corners of the bill are specified to determine the center location coordinates from the coordinates of the four corners so that the effective area in the buffer memory is decided with reference to the determined coordinates. The monochrome image of the effective area is equally divided, and the characteristic data of the equally divided density image are determined so that a binary threshold value may be decided by extracting a constant statistical quantity from the characteristic data. In the apparatus, the paper sheet is partially read to recognize its kind and genuineness, thus providing an effect that the recognition is not adversely affected even when the paper sheet is dislocated by the transfer.

In the discrimination apparatus for discriminating the kind and genuineness of the bill, as described above, consideration has been taken in the prior art into the displacement or the oblique dislocation but not into the case in which the image of the pattern is dislocated with respect to the contour frame. The bill such as the US dollar bill is circulated even if the external contour 1*a* and the pattern 1*b* of the bill 1 are dispersed, as shown in FIG. 2, due to the cutting dislocation. In the paper sheet discriminating apparatus for deciding the kind and direction of the bill by recognizing the image characteristics of the bill, the image in the discrimination area 2 to be discriminated is blocked on the basis of the external shape determined, and the bill is discriminated with the blocked image information. As shown in FIG. 2, however, the image in the blocked discrimination area 2 is dislocated from the pattern 1*b* so that the discrimination such as the pattern matching cannot be precisely performed. In other words, there arise a problem that the rejection of bills frequently occurs. In the circulated bills, on the other hand, it seems that the cutting dislocations are mostly the parallel ones and extremely few oblique ones, but no consideration is taken into the parallel dislocations. When the target of discrimination is a bill such as the US dollar bill the pattern of which may be dislocated with respect to the sides of the external shape, the discrimination apparatus of the prior art may be unable to recognize the normal bill, thus raising a problem that the discrimination percentage is lowered.

SUMMARY OF THE INVENTION

The present invention has been conceived in view of the background thus far described and has an object to provide a paper sheet discriminating apparatus and method capable of discriminating even a paper sheet such as a US dollar bill, in which the location of a pattern is dislocated from the periphery due to a printing shear or a cutting dislocation, efficiently without any drop of the discrimination percentage by using the image of the paper sheet.

The present invention relates to a paper sheet discriminating apparatus and method for deciding the kind or genuineness of the paper sheet such as the bill. According to the present invention, the above-specified object is achieved by a paper sheet discriminating apparatus for deciding at least the kind of a paper sheet on the basis of its pattern by sampling the image of its whole surface, wherein the improvement resides in that the dislocation of the pattern, as viewed from the contour, is detected on the basis of the marginal length of said paper sheet from the outer periphery to the pattern, thereby to correct a pixel position for providing a base point for the image recognition of said paper sheet, with the detected dislocation.

The object of the present invention is also achieved by a paper sheet discriminating apparatus for discriminating a paper sheet in terms of its pattern by irradiating said paper sheet with a light to receive at least the reflected one of a transmitted light and a reflected light obtained from said paper sheet, comprising: contour center coordinate extracting means for determining the center coordinates from the contour of said paper sheet on the basis of image data of said paper sheet; and marginal length extracting means for extracting the marginal length of the outer periphery of said paper sheet from the contour to the center coordinates, wherein the difference in the marginal lengths from the contour edges of the individual two sides of said paper sheet in the longitudinal and transverse directions is determined by said marginal length extracting means so that the center coordinates of said pattern may be obtained by correcting the center coordinates from the contour, as determined by said contour center coordinate extracting means, by using said difference. Moreover, the object is achieved more effectively by a paper sheet discriminating apparatus, wherein the difference of said marginal lengths is determined at the portion, where the channels at the identical position in the transfer direction and the lines in the transfer transverse direction are identical, to prevent an excessive correction by substituting a predetermined maximum when said difference is no less than a predetermined value, and to determine an average value by excluding the maximum and the minimum of the marginal lengths of a plurality of portions of each side.

On the other hand, the object of the present invention is achieved by a paper sheet discriminating method for discriminating a paper sheet in terms of its pattern by irradiating said paper sheet with a light to receive at least the reflected one of a transmitted light and a reflected light obtained from said paper sheet, comprising: determining the difference between the marginal lengths from the individual two side edges of said paper sheet in the longitudinal and transverse directions, to determine the center coordinates of said pattern by correcting the center coordinates determined from the edges of the individual two sides of said paper sheet with said difference; and determining the difference between said marginal lengths at the portion, where the channels at the identical position in the transfer direction and the lines in the transfer transverse direction are identical, to prevent the excessive correction by substituting a predetermined maximum when said difference is no less than a predetermined value, and to determine an average value by excluding the maximum and the minimum of the marginal lengths of a plurality of portions of each side.

BRIEF DESCRIPTION OF THE DRAWINGS

In the accompanying drawings:

FIG. 9 is one example of a table to be used for detecting the marginal length according to the present invention;

FIG. 10 is a diagram showing one example of the marginal length detection result according to the present invention;

DESCRIPTION OF THE PREFERRED EMBODIMENTS

In the present invention, there is disclosed a paper sheet discriminating apparatus of the type in which the image data of a bill such as a US dollar bill having a printing shear or a cutting dislocation are fetched as digital data of pixel values by using an image line sensor and developed in a memory. In this paper sheet discriminating apparatus, the length of the white portion in the periphery of the bill from the contour to the pattern is determined to detect the dislocation of the pattern thereby to correct the pixel point acting as a base point for the image recognition with the detected dislocation, so that even the bill having an image dislocation can be efficiently discriminated. Of all, the US dollar bill has a pattern portion enclosed by a frame so that the pattern portion can be suitably specified, but has a poor paper quality so that it is frequently encountered by the cutting dislocation. The invention can be suitably applied to a discrimination apparatus for discriminating paper sheets such as the US dollar bill which has the pattern dislocation with respect to the contour.

The present invention will be described in detail in connection with its preferred embodiment with reference to the accompanying drawings.

Figure 1:
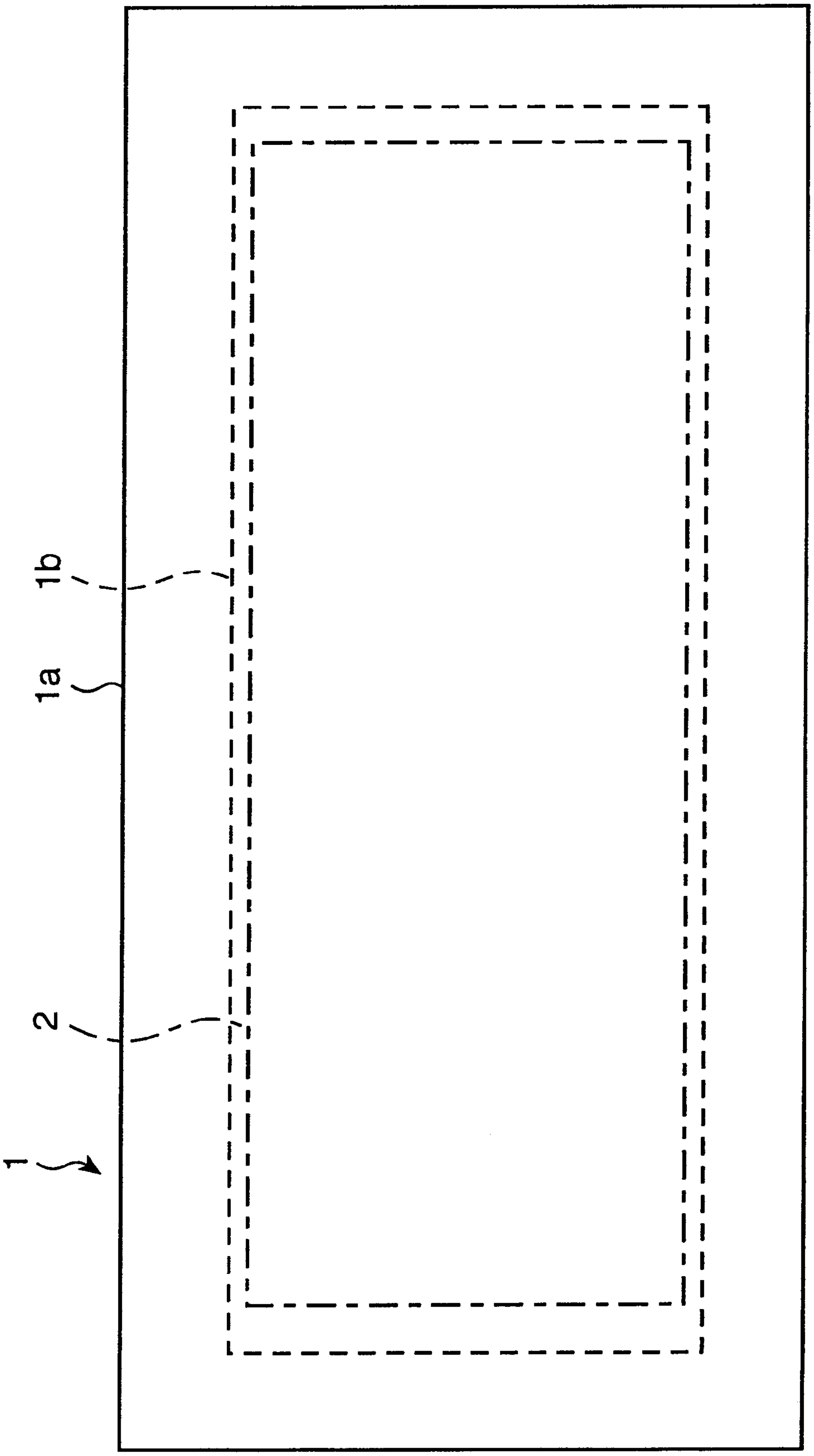
FIG. 1 PRIOR ART
FIG. 1 is a schematic diagram showing relations between a shape example of a general bill and an area to be discriminated.
Figure 2:
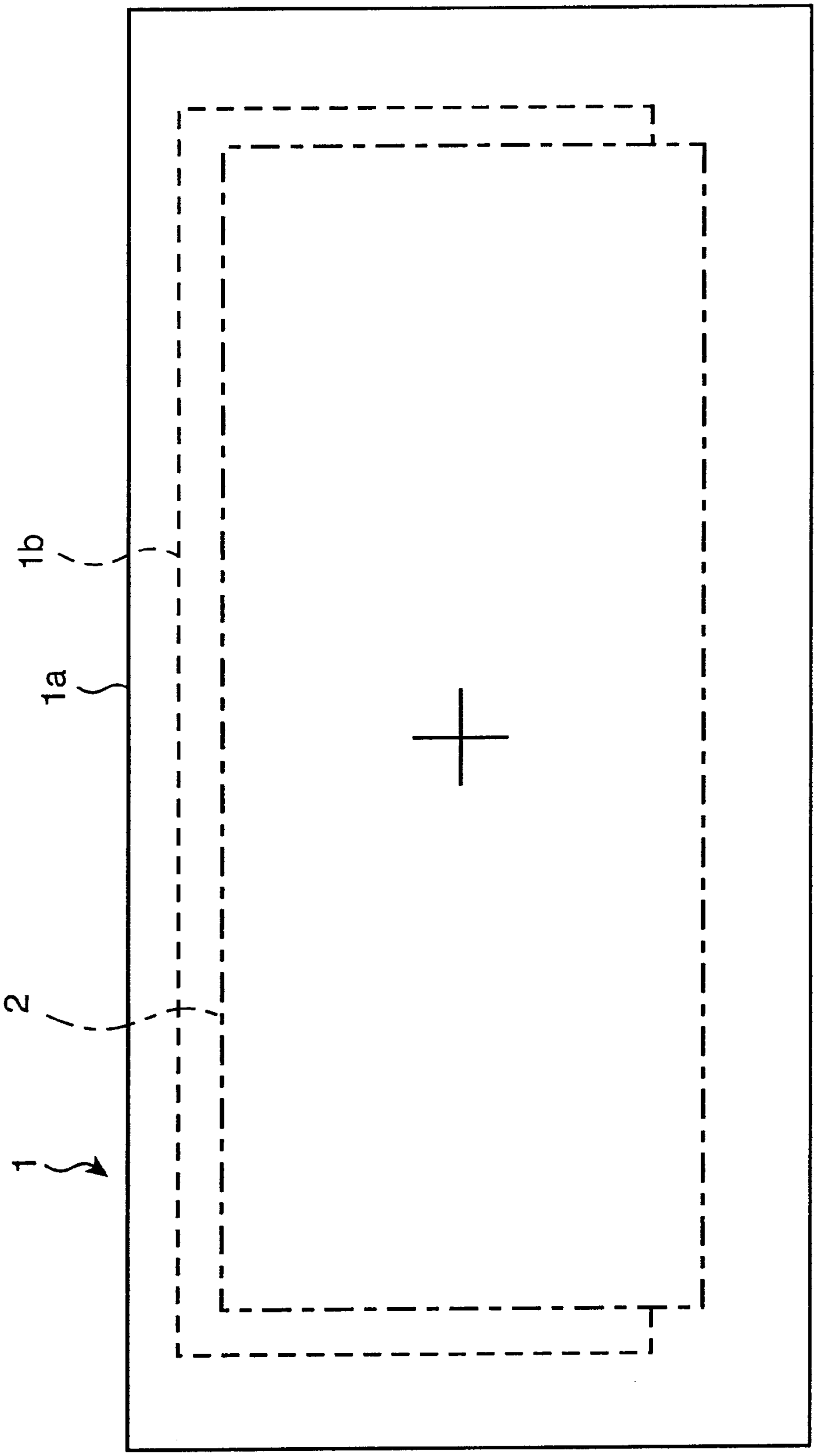
FIG. 2 PRIOR ART
FIG. 2 is a schematic diagram showing relations between a shape example of a bill having a cutting displacement and the area to be discriminated.
Figure 3:
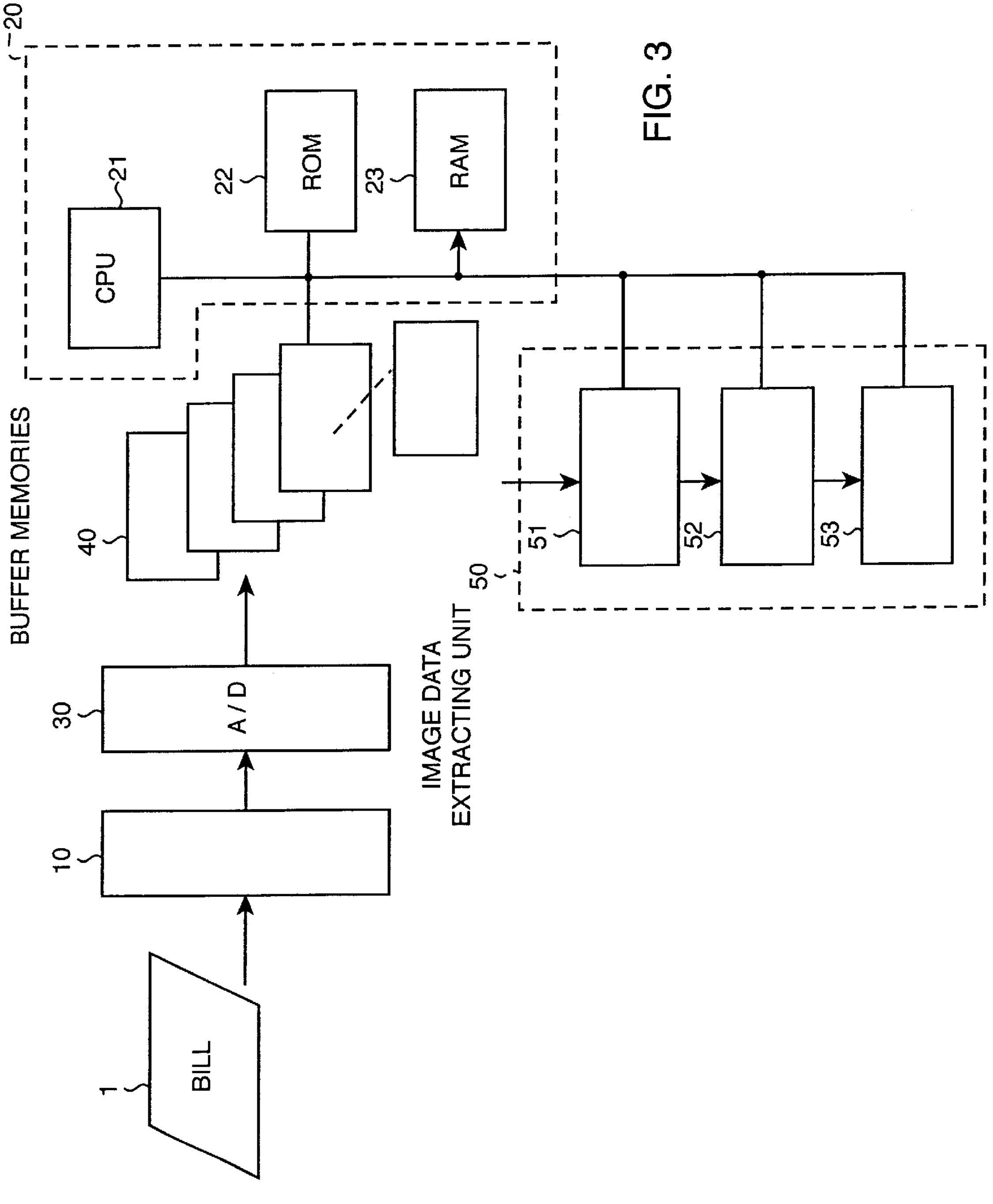
FIG. 3 is a block diagram showing an example of the construction of an essential portion of a paper sheet discriminating apparatus according to the present invention.

FIG. 3 is a block diagram showing an example of the construction of an essential portion of a paper sheet (as will be exemplified by a "bill") discriminating apparatus according to the present invention. In FIG. 3, an optical sensor unit 10 is constructed to array a number of detectors at predetermined positions over a not-shown bill transfer passage and in line with the transfer direction of a bill 1 and to include an image line sensor made of an LED array and a photodiode array. The optical sensor unit 10 scans the bill 1, as being transferred, in a planar shape to detect the distribution of physical properties of a reflected light or a transmitted light at the individual positions over the bill 1. Here, the embodiment will be described in case it uses the optical sensor having both the transmission type sensor unit and the reflection type sensor unit.

An A/D conversion unit 30 subjects the output of the optical sensor unit 10 to an A/D conversion so that the output may be subsequently handled as digital data. The data of individual pixels, as converted into the digital values, are stored in four buffer memories 40, as will be described in the following. In this embodiment, four kinds of lights of two transmitted wavelengths and two reflected wavelengths are received so that the detected pixel data of the bill 1 are temporarily stored in the four (i.e., two wavelengths x transmission/reflection) buffer memories 40.

An image data extracting unit 50 is constructed to include a contour center coordinate extracting means 51, a marginal length extracting means 52, a correction value computing means 53 and a later-described image extracting means. The marginal length extracting means 52 compares the content temporarily, as stored In the buffer memories 40, with a predetermined threshold value to extract the marginal width (or marginal length) of the bill 1 from the outer periphery or the contour edge to the pattern at every longitudinal and transverse portions, and the extracted marginal lengths of the individual portions are stored in a marginal length counter.

The correction value computing means 53 determines the dislocation of the pattern, as viewed from the contour of the bill, on the basis of the marginal length stored in the marginal length counter, and corrects the pixel positions providing the basis for the image recognition, from the determined dislocation. Here, this basis for the image recognition is exemplified by the center coordinates of the bill. Generally, the contour center coordinates, as determined from the contour edge by the contour center coordinate extracting means 51, are adopted as the center coordinates of the bill. In the present invention, the differences in the marginal lengths from the contour edges of the individual two sides in the longitudinal and transverse directions are determined by the marginal length extracting means 52 so that the contour center coordinates are corrected by using the differences.

As the not-shown image extracting means, there is provided image blocking means for dividing the area to be discriminated, into a preset number of blocks on the basis of the determined image center coordinates and an oblique information, to determine the sum of the image data of the divided individual blocks as a block value. There is also provided normalization means for normalizing the individual block values by dividing them by the sum of the individual block value blocked by that image blocking means.

A discrimination unit 20 is constructed to include: a CPU 21 acting as a paper sheet discriminating unit for controlling the operations; a ROM 22 for storing an operation program; and a RAM 23 for storing reference data and so on. The discrimination unit 20 collates the normalized data stored in the buffer memories 40 to the reference data (i.e., the normalized reference data for providing references for the individual kinds of bills) to discriminate (or distinguish) the bill 1. The reference data to be used for the discriminations are composed of predetermined check positions on the bill and the allowance data at the predetermined positions and are registered in advance in tables prepared for the bill kinds and their directions.

Here will be described the construction of a line sensor according to the present invention.

Figure 4:
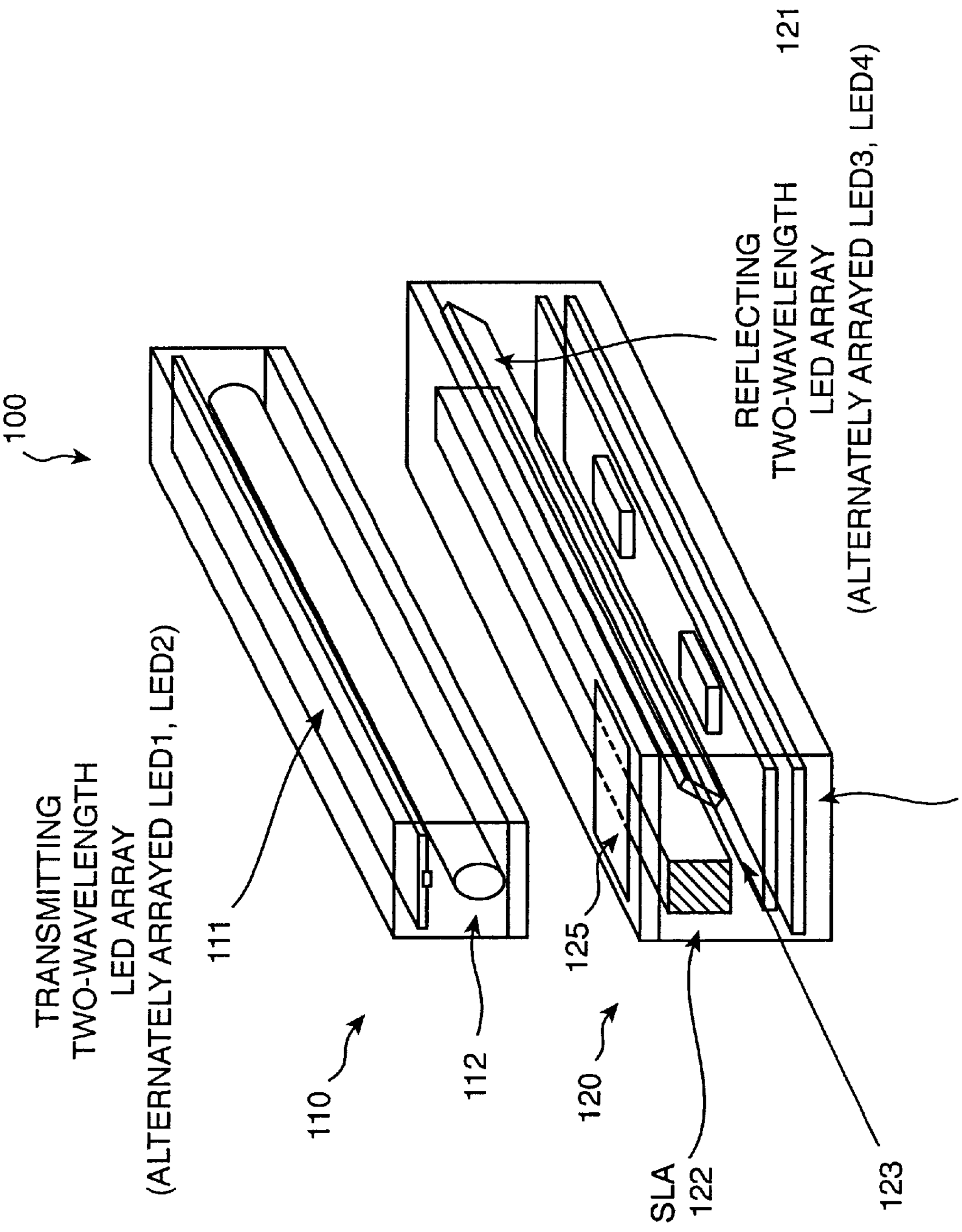
FIG. 4 is a perspective view schematically showing an example of the construction of a line sensor according to the present invention.

FIG. 4 shows an example of the construction of a transmission/reflection type line sensor 100 having a multiple wavelength light source. The line sensor 100 is constructed to include a light emitting unit 110 and a light receiving/emitting unit 120 which are formed into rectangular shapes confronting each other, and the bill 1 is transferred as a medium to be discriminated, in a bill passage between the light emitting unit 110 and the light receiving/emitting unit 120. Of these, the light emitting unit 110 is integrally constructed of a linear transmitting two-wavelength LED array (of alternately arrayed LED1 and LED2) 111 and a bill irradiating rod lens 112 to irradiate the passing bill homogeneously. On the other hand, the light receiving/emitting unit 120 is integrally constructed of: a linear reflecting two-wavelength LED array (of alternately arrayed LED3 and LED4) 121; a receiving photodiode array 123; an SELFOC lens array (SLA) 122 for enhancing the directivity to improve the resolution; and a multiplexer circuit 124 capable of controlling the storage time periods of the individual elements of the photodiode array 123. The transmitting two-wavelength LED array 111 and the reflecting LED array 121 are controlled a current-controlled drive circuit, and the sensed output of the photodiode array 123 is controlled with a suitable storage time period according to the emission wavelength by the multiplexer circuit 124 and is outputted. The LED array is generally exemplified by the combination of LED elements for emitting a red light and another visible light as well as by a combination of red, green and orange colors. When the LED array is used for the bill and so on, the yellowish green color is advantages for judging the damage and genuineness of the bill because it is made different in the absorption patterns of the transmitted light and the reflected light by the relation to the coloring of the bill when lights of two wavelengths are emitted. In the present invention, therefore, both the transmitted light and the reflected light are exemplified by an infrared ray (940 nm) and a yellowish green ray (570 nm). Considering the common use of the receiving side, on the other hand, the transmitting two-wavelength LED array 111 and the reflecting LED array 121 are desired to be alternately arranged on a common straight line but also desired to be staggered when they are arranged in two lines. On the other hand, the light emitting elements are exemplified by LEDs but can be other elements. Moreover, the two wavelengths are adopted for the transmission and for the reflection, but a plurality of wavelengths can be freely processed independently of the transmission or the reflection.

In this embodiment, the transmitting two-wavelength LED array 111 and the reflecting LED array 121 are constructed by arraying sixty four (one light source x two wavelengths) IR ray (e.g., infrared ray of 940 nm) emitting LEDs and YG ray (e.g., yellowish green light of 570 nm) emitting LEDs alternately on a straight line. The light receiving sensor (or the photodiode array 123) is constructed of a linear array having photodiodes arrayed linearly by arraying 128 channels at a predetermined interval (e.g., 1.6 mm pitch) to receive totally four kinds of lights of the transmitting two-wavelength lights and the reflecting two-wavelength lights by the single image sensor. Of the transmission type sensors and the reflection type sensors, moreover, the contour is indexed on the basis of the output of at least the reflection type sensor to correct the center coordinates of the pattern data of the bill. Here, some bill can be discriminated by only one of the transmission type sensor and the reflection type sensor. This embodiment is provided with both the sensors having light sources of multiple wavelengths so that it can match the various bills of worldwide countries so that the transmission/reflection can be variably controlled according to the individual countries and the kinds of their bills to detect the contour edge and the pattern of the bill from the optimum image data of the sampled data of the transmitted light/the reflected light by a plurality of wavelengths.

On the other hand, the reflecting reception side module is provided with a monitoring white area 125 so that the storage time period may be adjusted to a constant quantity of received light before the start of the bill discrimination by controlling the light emitting time period of the LEDs. When a common light receiving element is used for light sources of a plurality of different wavelengths, more specifically, the sensitivities of the light receiving elements are made different by the receiving wavelengths. In the present invention, however, the storage time period at the receiving time of the light receiving elements is controlled to eliminate the error due to the sensitivity difference and the dispersion of the light quantity.

In the construction thus far described, an example of the operation of the paper sheet discriminating apparatus according to the present invention will be described with reference to the flow chart of FIG. 5. Here, the description of the technical items relating to the extraction of the image data will be limited to that of the characteristic items and will be made in detail on the correction of the positional dislocation of the pattern according to the present invention.

First of all, here will be described an example of the operation at the data sampling time at Step S1 of FIG. 5.

For fetching the data, a mechanical timing clock is used to read the pixel data from the line sensor 100 at every transfers of the bill 1 by 1.5 mm, for example. The reading operations are: at first (1) to read one line by pulse-flashing the IR ray (or infrared ray) light emitting LED (as will called the "IR ray LED") by the transmitting LED array 111; next (2) to read one line by pulse-flashing the YG ray (or yellowish green ray) light emitting LED (as will be called the "YG ray LED") by the transmitting LED array 121; (3) to read one line by pulse-flashing the reflecting IR ray LED; and (4) to lead one line by pulse-flashing the reflecting YG ray LED, and these operations (1) to (4) are termed as one cycle.

The line sensor 100 time-shares the transmitting IR ray, the transmitting YG ray, the reflecting IR ray and the reflecting YG ray in the recited order and reads the pixel data by the common receiving photodiode array 123. The adjustment of the sensitivity is made by adjusting the light emissions of the individual LEDs composing the transmitting two-wavelength LED array 111 and the reflecting LED array 121, and the light storage time period by the light emitting time period. Here, the correction of a dark output is made by the light receiving circuit. The individual lines are scanned in synchronism with the mechanical clocks which are generated according to the transfer distance of the bill 1. In this example, a scan trigger signal is generated at every transfers of 1.5 mm, and the aforementioned one reading cycle is executed during the transfer of the bill 1 of 0.1 mm, so that the scannings of the transmitting IR, the transmitting YG, the reflecting IR and the reflecting YG are completed in the recited order. The scan starting period occurs at every transfers of 1.5 mm.

Next, here will be described the method for developing the image data on the buffer memories 40.

The data for the transmitting IR, the transmitting YG, the reflecting IR and the reflecting YG of each line, as fetched from the optical sensor unit 10, as described hereinbefore, are sequentially converted into the digital data individually through the A/D conversion unit 30 and are stored in the corresponding buffer memories 40. For the aforementioned transmitting IR, transmitting YG, reflecting IR and reflecting YG, there are prepared the four buffer memories 40. For the transmitting IR ray, for example, there are prepared memory addresses of 128 channels×96 lines (96×1.5 mm=144 mm at the maximum in the transfer direction). In this example, there is provided a timing sensor which is programmed to end the sampling of the data when the back end of the bill passes through the image line sensor 100. Like the buffer memories 40, there is prepared in the RAM 23 memories which have predetermined capacities for the transmitting IR ray, the transmitting YG ray, the reflecting IR ray and the reflecting YG ray.

Next, here will be described the operations from Step S2 (for a binary processing) to Step S4 (for lefthand/righthand edge detections) of FIG. 5.

When the bill 1 is to be discriminated, a highly precise image data extraction is needed considering a breakage of the end portion and the influences of the oblique position of the bill. In the image data extracting unit 50, on the basis of the data of the transmitting IR ray, the sampled data are made binary with the threshold value and are stored in the RAM 23. In order to determine the front end edge and the back end edge, the address of the RAM 23, at which the value "1" is stored, is then searched for the individual channels (in the longitudinal direction) to determine the front end coordinates and the back end coordinates. When the coordinate difference (or the bill length) between the front and back ends of each channel is no less than a predetermined value, there is determined the channel of the place where the front end and the back end (so as to exclude the portions of the two sides of a triangle because of an inclination) are present. For this channel, the coordinates of the front end are located at a position of "0→1" whereas the coordinates of the back end are located at a position of "1→0".

Figure 7:
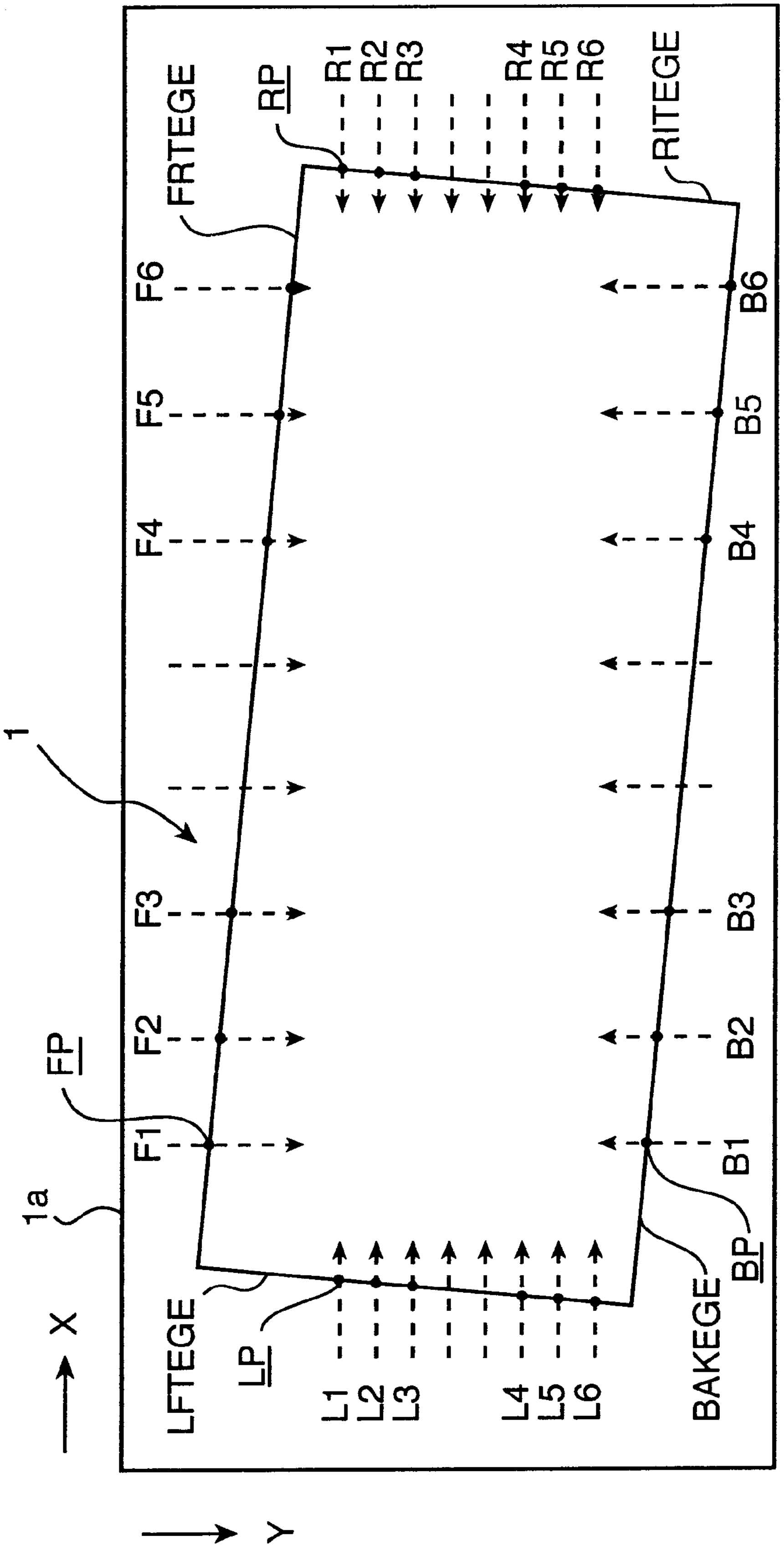
FIG. 7 is a diagram for explaining a marginal length computing method according to the present invention.

Here, the scanning direction is in the transfer direction. The sensing operation is performed downward (in the Y-direction) in FIG. 7 showing an example of the image of the inserted bill 1. Even if the bill 1 has a hole, the coordinate in theY-axis direction for the last change of "1→0" is adopted as the back end coordinate (whereas the X-direction is designated by the channel No.) by using a common memory register.

Here will be described the operations at Step S5 of FIG. 5 to compute the center coordinates and to extract the oblique angle on the basis of the contour edge informations.

Figure 12:
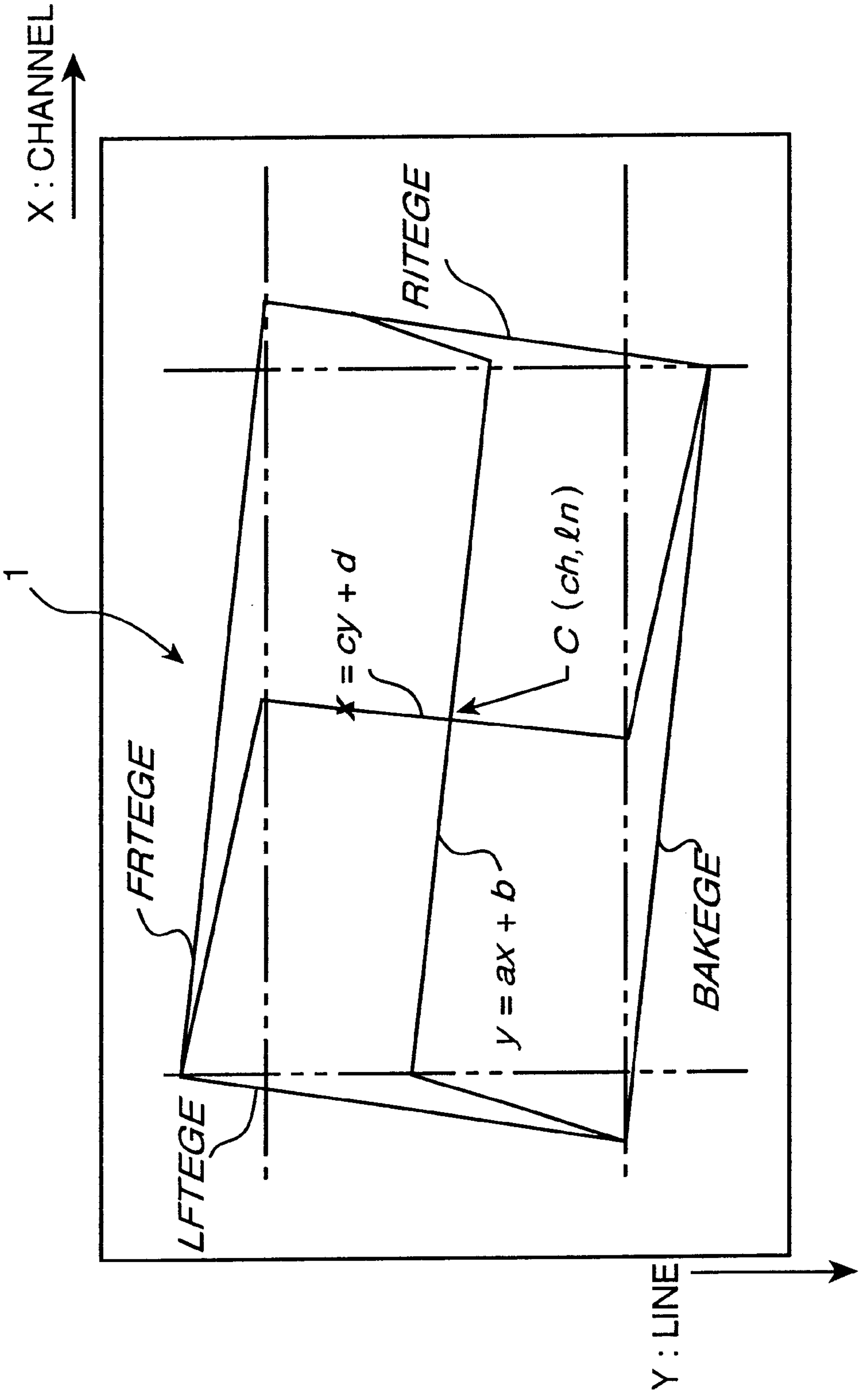
FIG. 12 is a schematic diagram for explaining a method for computing the center coordinates from the contour of a bill.

In the image data extracting unit 50, of the bill widths thus obtained, the most frequent value is utilized as the actual bill length in the computations of the center line for determining the center coordinates. The center position detecting means in the image data extracting unit 50 performs the computation of "(the front end+the back end)/2" to determine the center straight line "y=ax+b" between the front side FRTEGE and the back side BAKEGE of the image of the bill 1, as shown in FIG. 12. For the left and right sides LFTEGE and RITEGE, the common channel (by sensing the memories in the X-direction) is sensed to determine the center straight line "x=cy+d" of the longitudinal sides. Then, the center coordinates C (ch, ln) are determined from the two straight lines determined. From the gradient of the straight line "y =ax+b", on the other hand, there is obtained an angle θ for the turning correction. This angle θ is used in the later-described image turning operation of Step S8.

Here will be described the operations of Step S6 of FIG. 3 to detect the cutting dislocation and to correct the center coordinates.

Figures 8A, 8B:
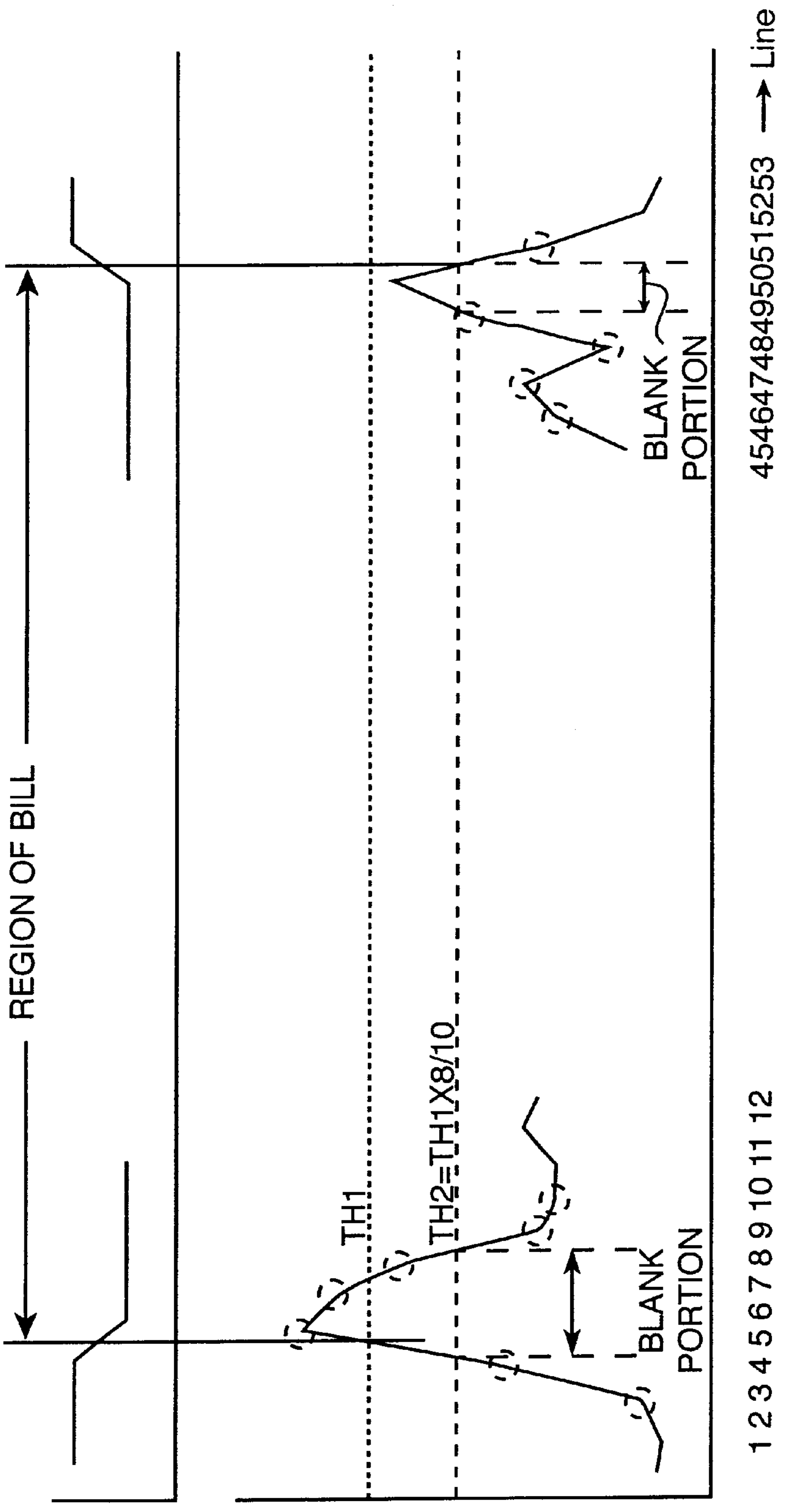
FIGS. 8A and 8B are diagrams showing one example of a medium presence detecting signal and a detection signal of the line sensor according to the present invention.

FIG. 8B shows the detection signal of the line sensor 100, and FIG. 8A shows a medium existing portion as a recessed portion. It is preferable to use the transmitting light for extracting the contour of the medium. Moreover, the reflected light data of the YG ray are used for specifying the pattern portion. A value TH1 (or a threshold value 1), as indicated in FIG. 8B, has a 50% luminance of the reflected output, as detected in the monitoring blank portion disposed in the sensor in this example, and a value TH2 (or a threshold value 2) is set by a relation of "TH2=TH1×0.8". The numerals at the lowermost portion of FIG. 8B indicate the number of lines (or the number of the scanning lines in the transfer direction), as cut out for extracting the image. The marginal length extracting means 52 scans inward of the medium for the YG ray output of the reflected light with respect to a plurality of portions on the contour edge, as obtained from the received light output of the transmitting IR ray, and compares the data of the pixels with the individual threshold values. If the pixel data are within the range between the aforementioned threshold values TH1 and TH2, for example, the marginal length extracting means 52 decides that the portion belong to the margin, and counts the pixel number (or the line number or the channel number) within a predetermined retrieval range thereby to determine the lengths of the individual margins of the front and back end portions (or the longitudinal end portions) and the transverse short portions of the outer peripheral portions of the bill 1 on the basis of the counted resultant values for the individual sides and portions of the bill 1.

Here will be specifically described the operation to detect the marginal lengths of the longitudinal end portions.

First of all, the marginal length extracting means 52 sets the starting point and the retrieval number. As shown in FIG. 7, a plurality of portions to be detected (for the margins) are individually set for the individual end portions (i.e., the front end portion FRTEGE, the back end portion BAKEGE, the left end portion LFTEGE and the right end portion RITEGE) of the contour edges of the bill 1. At this time, the portions are set within the range of a rectangular frame, as indicated by double-dotted lines in FIG. 11. This is because the places where the image data of the bill 1 are present can be retrieved even in the oblique position when the marginal lengths are to be detected by retrieving the portions in the channel direction and in the line direction toward the center portion. In this embodiment, the rectangular region (having the individual sides in parallel with the line direction and the channel direction), as inscribing the frame of the contour edges, is determined as the detection region by the subsequent operation, to set the plurality of portions to be detected for the marginal length within the range of the detection region. When the margins cannot be detected with the detection range, it is detected by scanning in the direction outward of the detection region, as will be described hereinafter.

Figure 11:
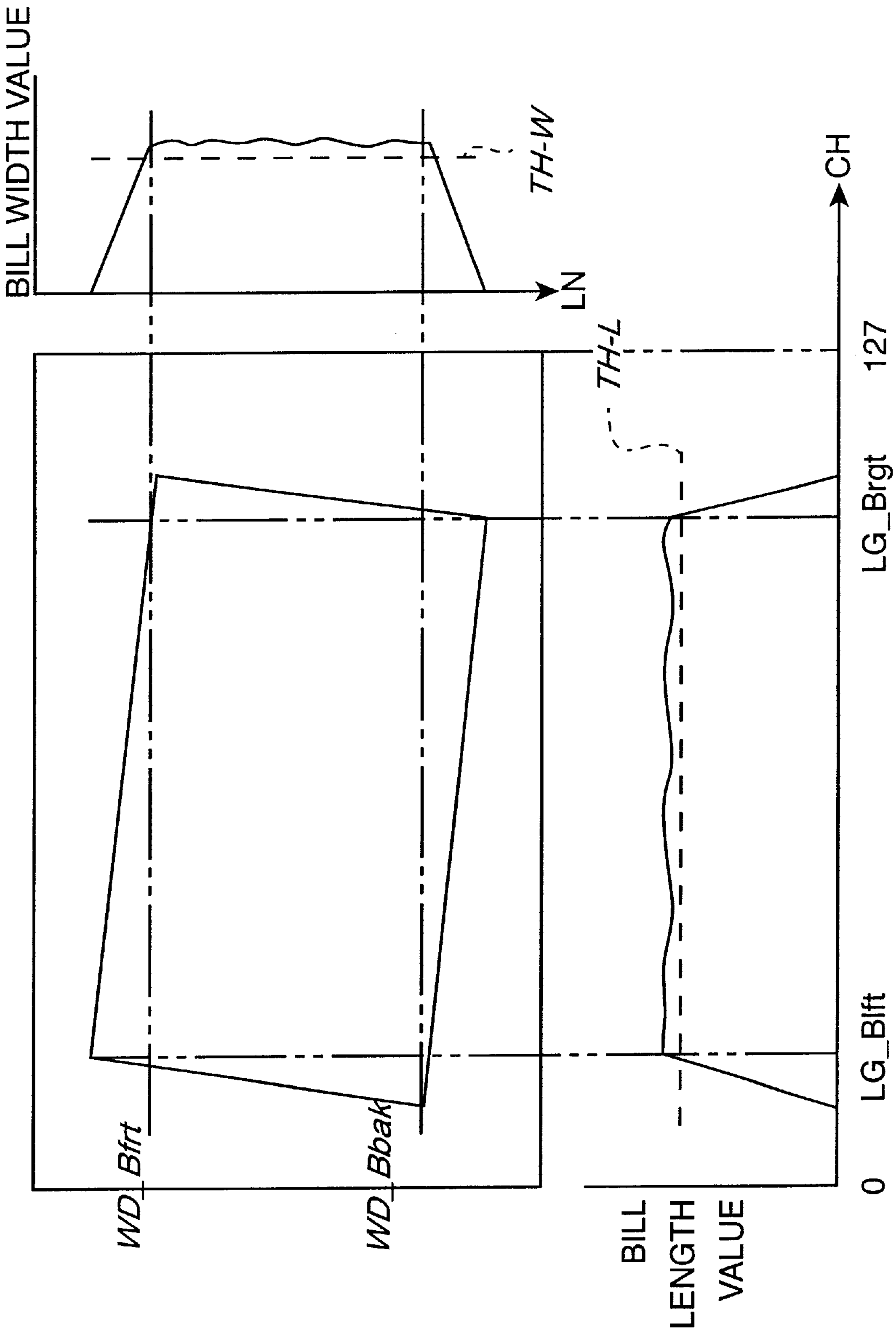
FIG. 11 is a schematic diagram showing a marginal length detecting region according to the present invention.

When the aforementioned detection region is to be determined, for the bill length values of the individual channels, as shown in FIG. 11, the scanning is started from the 0-channel to set a channel LG__Blft taking the threshold value TH-L or higher at first, and the scan is reversed from the 127 channel to set a channel LG__Brgt satisfying the same condition. For the bill width values of the individual lines, the scanning is started from the 0-line to set a line WD__Bfrt taking the threshold value TH-W or higher at first, and the scanning is reversed from the final one of the lines cut for extracting the image, to set a line WD__Bbak satisfying the same condition. The detection region is determined within the rectangular frame which is defined by those straight lines LG__Blft, LG__Brgt, WD__Bfrt and WD__Bbak, as indicated by double-dotted lines in FIG. 11.

In this example, of the individual end portions (i.e., the front end portion, the back end portion, the left end portion and the right end portion) set in the aforementioned rectangular detection region, the six portions (F1 to F6, B1 to B6, L1 to L6 and R1 to R6) excepting the central two portions are employed to extract the marginal lengths, as shown in FIG. 7. For the every six portions at the end portions, the pixel data are read by the number of retrievals from the starting point in the direction of the marginal width to determine the lengths of the margins. Here, the individual six portions F1 to F6 and B1 to B6 of the front end portion FRTEGE and the back end portion BAKEGE, as shown in FIG. 7, correspond to the positions of the channels (i.e., the positions on the X-axis), and the individual six portions L1 to L6 and R1 to R6 of the left end portion LFTEGE and the right end portion RITEGE correspond to the positions of the lines (i.e., the positions on the Y-axis). Moreover, the line No. and the channel No. correspond to the physical addresses of the buffer memories, but the description based on these physical addresses will be omitted.

Figure 6:
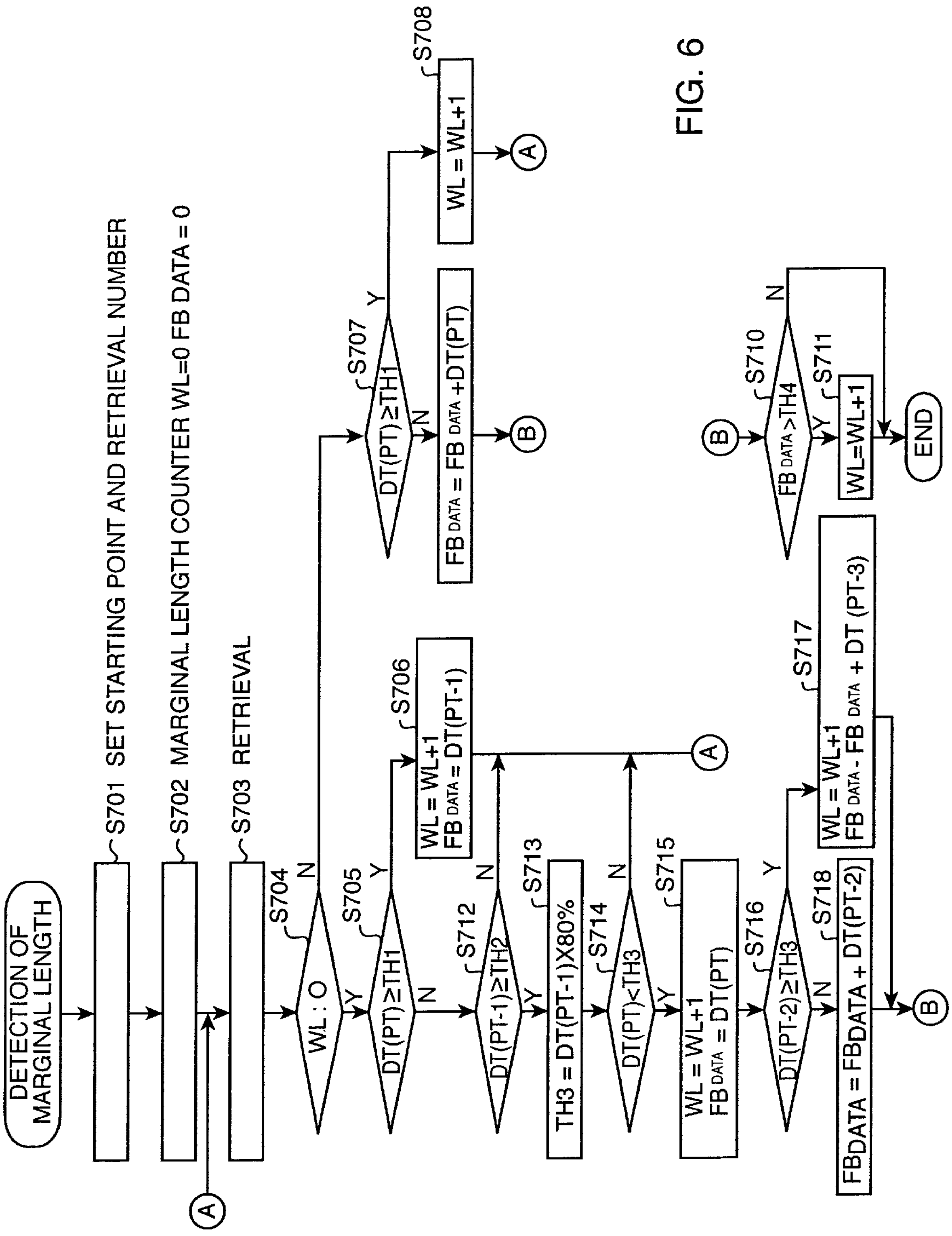
FIG. 6 is a flow chart showing one example of a marginal length detecting operation according to the present invention.

The operations to detect the marginal length at the portion F1 of the front end portion will be described in detail as a specific example with reference to the flow chart of FIG. 6. Here, the retrieval (or extraction) of the marginal length at each portion of the front end portion is performed by repeating the following steps by the number of retrievals from the portion F1 of the front end portion (or the starting point FP). For the remaining portions F2 to F6 and the individual portions 1 to 6 of the back end portion, the left end portion and the right end portion, however, the marginal lengths are determined by similar operations.

In this example, a point FP of the portion F1 on the front end edge is set as the starting point for the operations to detect the marginal length at the front end portion. Here, the retrieval number (or the line or channel number) is different depending upon the portion to be processed, so that the initialization is made (at Step S701) to read the retrieval number from the table shown in FIG. 9 and to store it in a manner to correspond to each end portion and the starting point.

As another initialization, a marginal length counter WL for counting the length (or width) of the marginal portion of the portion being considered is set with "0", and an FB data (or a working register to be used for the computations and to store the image data) is cleared to "0" (at Step S702).

In this example, the starting point FP of the operations to detect the marginal length is located at the portion F1 (where the line of the front end edge FRTEGE and the line of the arrowed line of the portion F1 intersect each other, as shown in FIG. 7) of the front end portion. When the location to be retrieved is expressed by PT (LN, CH) in a manner to correspond to the line/channel, the line LN includes the front end line number at the portion F1, and the channel CH includes the channel number at the portion F1. The following description will be made by simplifying the PT (LN, CH) by PT and by expressing the data corresponding to the location of PT by DT (PT). In this example, the retrievals at the front end portion are made five times 1 to 5 (at Step S703), as enumerated in FIG. 9.

First of all, it is decided (at Step S704) whether or not the marginal length counter WL is at "0". The initial value is "0" so that the routine advances to Step S705. At Step S705, the image data DT (PT) of the current retrieval position PT are read out and decided on whether or not they are not less than the threshold value TH1 (or brighter than the threshold value TH1). When the retrieval position PT is brighter than the threshold value TH1, moreover, the marginal length counter WL is incremented by "1", and the image data DT (PT−1) of the coordinates before one line are stored as the FB data. Then, the retrieval number is incremented by "1" to advance the position PT of the retrieval object In the direction of the marginal width (in the arrow direction of FIG. 11) (at Step S706), and the routine returns to Step S703, at which the next position is retrieved. The next retrieval number is "2", and the marginal length counter WL already has the value "1". Therefore, the routine advances from Step S704 to Step S707, at which it is decided whether or not "DT (PT) ≧TH1". If brighter than the threshold value TH1, the marginal length counter WL is incremented by "+1", and the routine returns to Step S703, at which a next position is retrieved (at Step S708).

Here will be described the case in which it is decided at Step S707 that "DT (PT)<TH1", that is, in which the pattern comes in the designated retrieval number. First of all, the image data of the portion being considered are read out, and the edge width counter WL is not "0" at Step S704 so that the routine advances to Step S707. Since DT (PT)<TH1, the computation of "FB data=FB data+DT (PT)" is performed (at Step S709). It is decided (at Step S710) whether or not the value is brighter than TH4 (TH4=TH1×1.5 in this example). If brighter, the portion is deemed to belong to the marginal portion, and the marginal length counter WL is incremented by "+1" (at Step S711). Otherwise, the portion is deemed to belong to the pattern portion, and the operations to compute the marginal length of the portion being considered are ended without incrementing the marginal length counter WL.

Here will be described the operations of the case in which no marginal portion is detected at the retrieval starting time so that the marginal length counter WL remains at "0". When it is decided at Step S704 that the marginal length counter WL is "0", it is decided whether or not "DT (PT)≧TH1". The routine advances to Step S706. if brighter, but to Step S712 if darker. At Step S712. it is decided whether or not the DT (PT−1) or the image data of the line before one line are no less than the threshold value TH2 (TH2=TH1×0.8). If darker than the threshold value TH2, the routine returns to Step S703, at which the next position is retrieved. If brighter than the threshold value TH2, the value of 0.8 times as large as the image data DT (PT−1) before one line is set as a threshold value TH3 (at Step S713) and is compared with the current image data DT (PT) (at Step S714). If "DT (PT)<TH3" at Step S714, that is, if darker than the threshold value TH3, the routine returns to Step S703, at which the next position is retrieved. If brighter than threshold value TH3, the portion is decided to belong to the marginal portion. Then, the marginal length counter is incremented by "1", and the current image data DT (PT) are substituted into the FB data (at Step S715). Subsequently, the image data DT (PT−2) before two lines are examined and decided (at Step S716) on whether or not they are brighter than the threshold value TH3. If brighter, the portion is decided to belong to the margin. Then, the marginal length counter is incremented by "+1", and the computation of "FB data+DT (PT−3)" is performed so that the computed value is substituted into the FB data (at Step S717). Then, the routine advances to Step S710. If "DT (PT−2)<TH3" at Step S716, the computation of "FB data+ DT (PT−2)" is performed so that the computed value is substituted into the FB data (at Step S718). Then, the routine advances to Step S710.

The computations of the marginal lengths based on the aforementioned flows are executed at the six portions for the front end portion, at the six portions for the back end portion, at the six portions for the left end portion and at the six portions for the right end portion. Here, the value PT−1 is taken in the line direction for the front end portion and the back end portion and in the channel direction for the left and right end portions. For the computations of the back end portion and the right end portion, on the other hand, the values "PT−1" and "PT−2" are changed to "PT+1" and "PT+2", respectively.

Here will be described the correction of the pixel position (or the center coordinates in this example) as the base point for the image recognition. Here will be exemplified the case in which the numerical values indicating the marginal lengths of the individual portions 1 to 6, as detected by the marginal length extracting means 52, at the front end portion and the back end portion are those enumerated in FIG. 10.

The correction value computing means 53 determines the differences ESA(1) to ESA(6) between the marginal lengths of the front end portion (or the left end portion) and the marginal lengths of the back end portion (or the right end portion), for the every individual portions 1 to 6 at the portions where the channels in the transfer direction and the lines in the transverse transfer direction are equal. When the value of the ESA(I) of the portion being considered is larger than a predetermined value, the correction value computing means 53 changes the value of the ESA(I) of that portion into the predetermined (maximum) value so as to prevent an excessive correction. In this example, the predetermined value is set to "±2", and the value "−3" of the portion 3 failing to fall within the range of "−2" is corrected to the predetermined (maximum) value "−2". Of the corrected differences ESA(1) to ESA(6) of the front and back marginal lengths of the individual portions, moreover, the four evaluation values excepting the maximum and the minimum are averaged to compute a correction value β of the pattern portion in the longitudinal direction (i.e., the line direction= the arrowed Y-direction of FIG. 7) with respect to the contour edge.

The operations to compute the aforementioned dislocation β will be specifically described with reference to the following expressions (1) and (2). First of all, the correction marginal length difference EgeSA is determined by the following expression (1):

$$EgeSA = \{(\sum ESI(I) - MaxESI(I) - MinESI(I)) + \gamma\}/4 \quad (1)$$

Here, letter γ designates a relaxation correction value expressed by γ="1", when the term in the expression (1) (Σ ESI(I)−MaxESI(I)−MinESI(I)) is negative, by γ="−1" when positive, and by γ="0" when "0".

$$\beta = EgeSA/2 \quad (2)$$

For the values of the front and back marginal length differences ESA(1) to ESA(6) of the individual portions 1 to 6 in FIG. 10, for example, the term Σ ESA(I) of the expression (1) is computed by (−2)+(−1)+(−2)+(−2)+(−2)+(−2)=−11. Here, ESA(3) takes the value of "−3" but is corrected to "−2" so as to prevent the excessive correction. On the other hand, the term MaxESA(I) taking the maximum absolute value of the front and back marginal length differences is located at the portion 3 but is likewise corrected to "−2". On the other hand, the term Σ MinESA(I) taking the minimum value Is located at the portion 2 and corrected to "−1". At this time, the relaxation correction value y to be employed is γ=1, because the term in the expression (ΣESI(I)−MaxESI(I)−MinESI(I)) is negative at "−8", so that the term { } of the expression (1) takes a value of "−7". This value of "−7" is divided by "4" to "−1.75". Here, the reason why the division is made with "4" is to determined the length of one marginal length by averaging the values of the four portions excepting the maximum and the minimum.

In the correction value computing means 53, the result EgeSA=−1.75, as determined by the expression (1), is changed to 1/2 by the expression (2) (because one half of the marginal length difference is the actual dislocation of the pattern center). In this example, β=−0.875. Moreover, the correction value β in the line direction is added to the value of the center coordinates C (ch, ln) determined from the individual sides (or the contour edge informations), and this sum is rounded to the value for the corrected center coordinate in the line direction. At this time, the center coordinates C (ch, ln), as determined from the contour edges, are stored not as an integer but as a numerical value having a decimal point so that no error may be caused by the rounding. In this example, the correction value β in the longitudinal direction (or in the line direction) is "−1" so that the pattern is dislocated upward by one line from the center portion.

Figure 14:
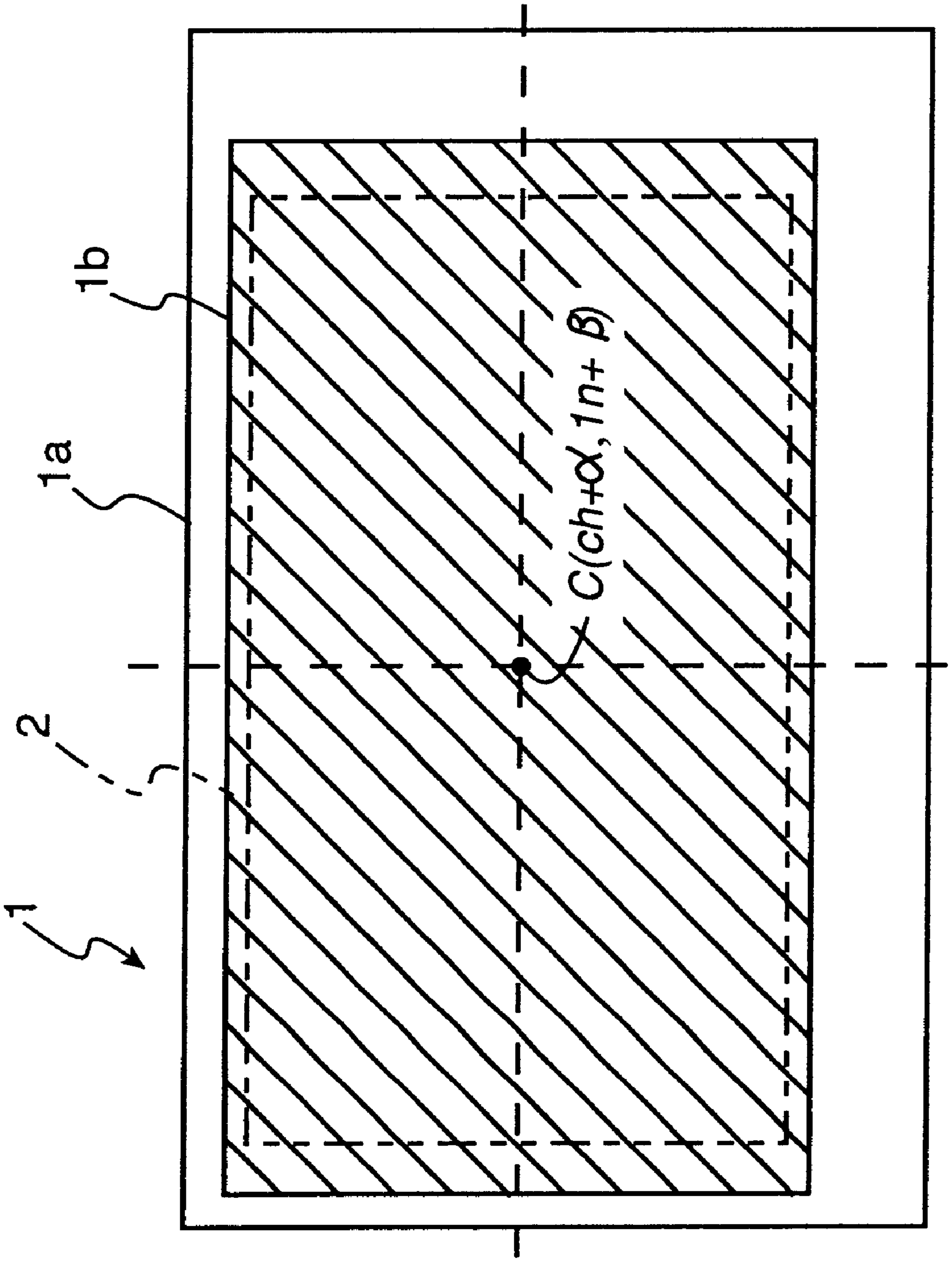
FIG. 14 is a schematic diagram showing center coordinates after a correction.

The correction value computing means 53 likewise obtains a correction value for the left and right marginal lengths. Here is omitted this description, and the "correction value of the pattern portion in the transverse direction (or in the channel direction) with respect to the contour edges " is designated by letter α. On these correction values α and β, moreover, the center coordinates C (ch, ln), as determined from the contour edge informations at the foregoing Step S5, are corrected and set as new center coordinates C (ch+α, ln+β), as shown in FIG. 14.

By using the new center coordinates C (ch+α, ln+β) determined by the foregoing operations, an area 2 to be discriminated is set and blocked. Then, the image of the blocked portion is fixed so that the subsequent discriminations can be stably performed to obtain a highly precise discrimination result even for a bill having a pattern dislocation with respect to the contour.

Here will be described the image turning operation (or the oblique dislocation correcting operation) at Step S7 of FIG. 5.

When the oblique dislocation to occur in the transfer course is to be corrected, the affine transformation is used. The address of the original image data with respect to the affine-transformed address is determined, and the image data of that place are copied to the address after the transformation.

Figures 13A, 13B:
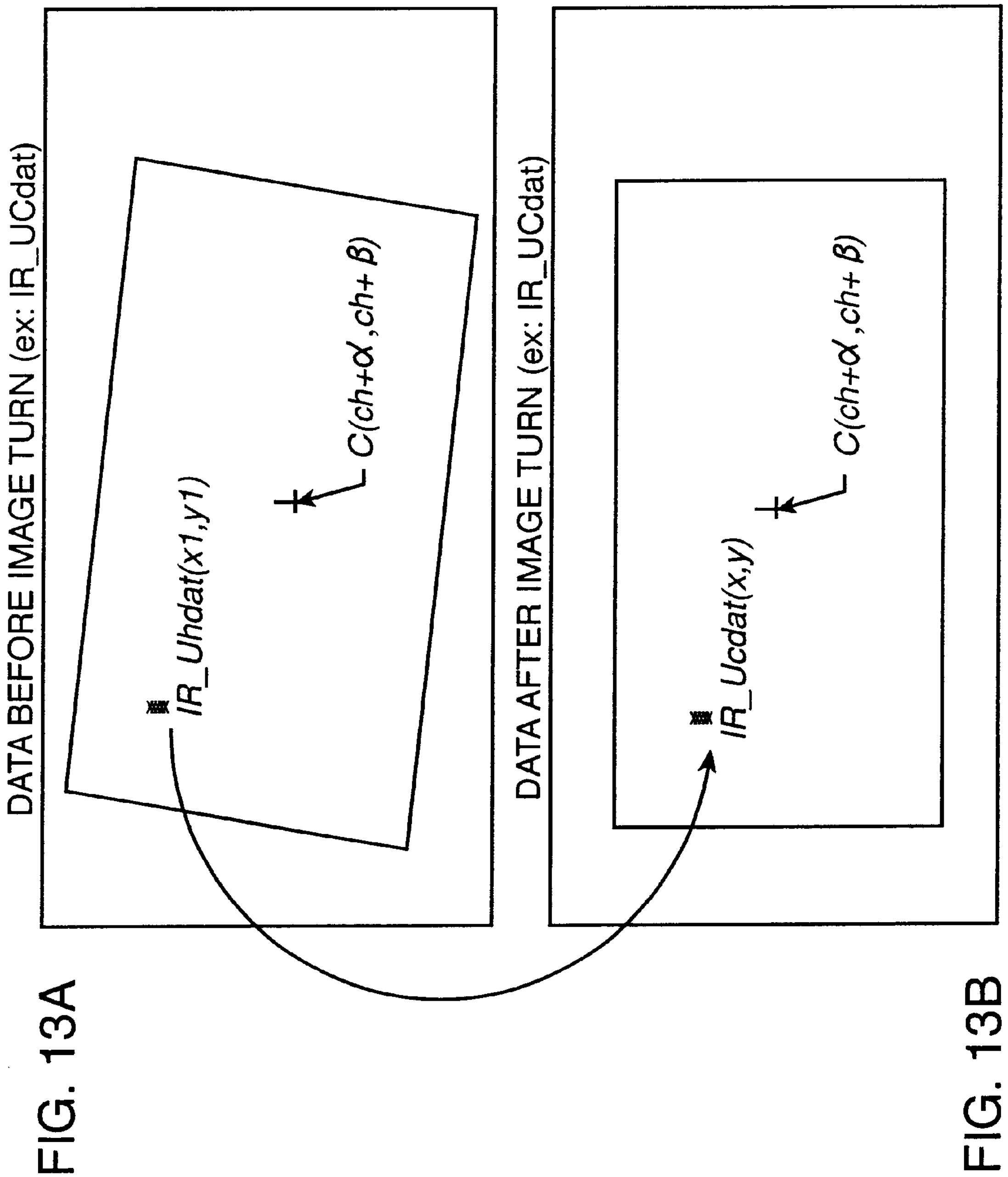
FIGS. 13A and 13B are a schematic diagrams showing data before an image turn and data after the image turn.

FIGS. 13A and 13B are schematic diagrams showing the data before and after the image turn. In the oblique correcting means of the image data extracting unit 50, the address of the pixel data IR-Uhdat (xl, yl) before the image turn, as corresponding to the address of the pixel data IR-Uhdat (x, y) after the image turn, is obtained by the computation of the following expression (3), and the target image data are copied. By these operations, it is possible to prevent the omission of the transformed coordinate data, as might otherwise be intrinsic to the ordinary affine transformation.

$$\begin{pmatrix} xl \\ yl \end{pmatrix} = \begin{pmatrix} \cos\theta & -\sin\theta \\ \sin\theta & \cos\theta \end{pmatrix} \begin{pmatrix} x - X \\ y - Y \end{pmatrix} + \begin{pmatrix} X \\ Y \end{pmatrix} \tag{3}$$

Here will be described the image blocking operation at Step S8 of FIG. 5.

The image blocking means in the image data extracting unit 50 divides the area to be discriminated into blocks of a preset number on the basis of the image center coordinates C (ch+α, ln+β) corrected and determined by the correction value computing means 53. With reference to the blocking left end position (or the channel No.), for example, the blocks are made for the individual channels and for the individual lines so that the image data are sequentially extracted at the block unit.

Figure 5:
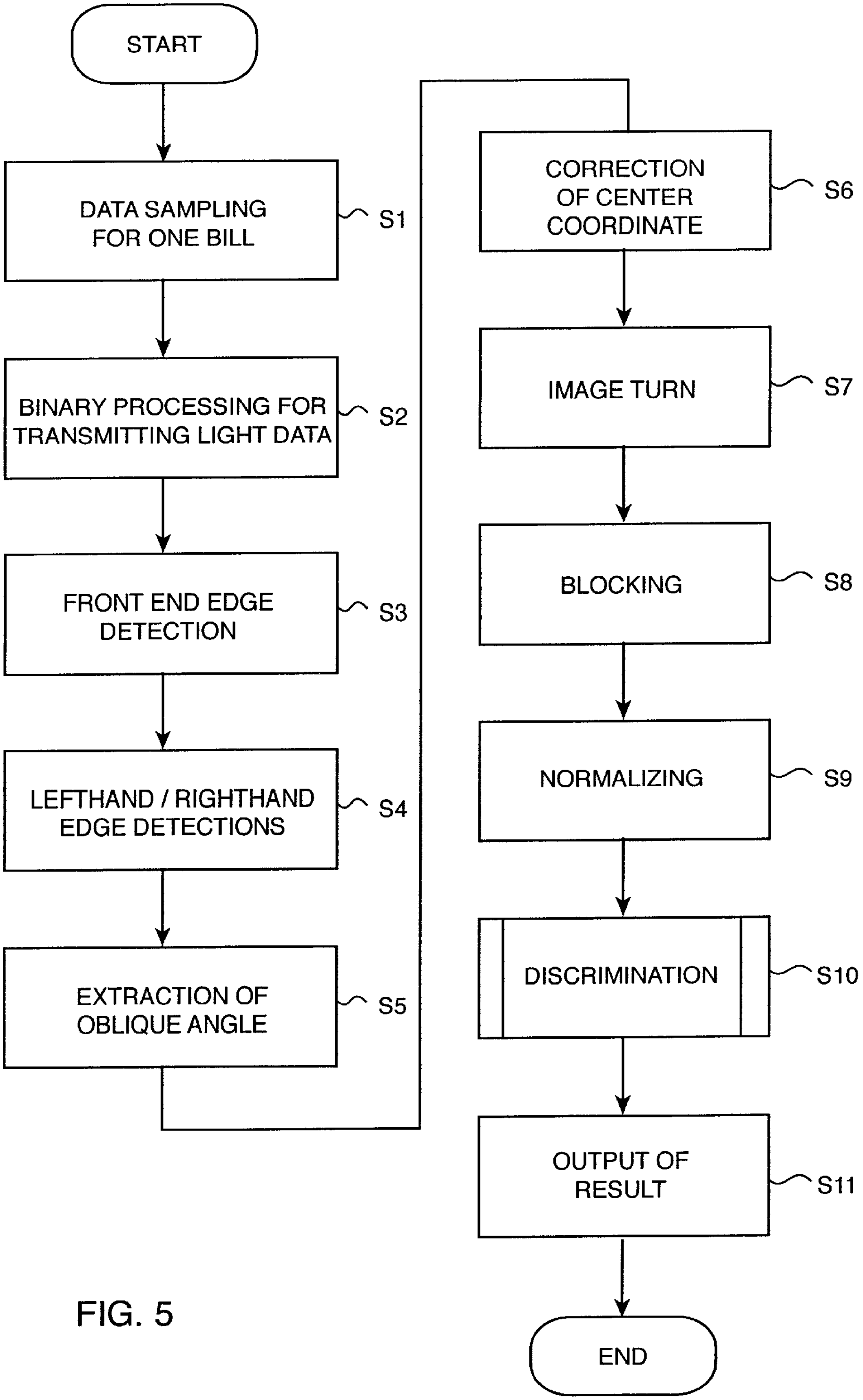
FIG. 5 is a flow chart showing an example of the operations of the paper sheet discriminating apparatus according to the present invention.

Here will be successively described the operation to normalize the image at Step S9 of FIG. 5.

The image normalizing means in the image data extracting unit 50 performs the normalization by dividing the values of the individual blocks by the sum of the image data blocked by the image blocking means. By this normalization, the discrimination can be made irrespective of the fluctuation in the whole brightness of the image.

Here will be successively described the operations to discriminate and to output the discrimination result at Steps S10 and S11 of FIG. 5.

The discrimination unit 20 performs the pattern recognition by comparing and collating the pattern, as obtained by integrally averaging and normalizing each block, with a prepared reference pattern, to discriminate the kind, genuineness, side, direction and so on of the bill 1 and to output these discrimination results.

Here, the foregoing embodiment has been described on the bill, for example, but the present invention should not be limited to the bill. The present invention can be applied to a paper sheet having a marginal portion in the periphery of a pattern, such as stocks. Although the present invention has been described on the case in which the base point of the image recognition is located at the center coordinates of the bill, on the other hand, the present invention can be applied to the case in which the base point is other than the center coordinates. Moreover, the shape of the pattern of the bill has been described as the rectangular shape, as shown, but the present invention should not be limited to the bill having the rectangular pattern or the rectangular pattern frame. The center of the pattern, as defined in the invention, corresponds to the center of gravity of the pattern. Thus, the present invention can be applied to a pattern of an arbitrary shape.

According to the present invention, as has been described hereinbefore, for the paper sheet such as the US dollar bill having a pattern portion dislocated due to a cutting mistake or a printing shear, the dislocation of the pattern portion, as viewed from the contour, is detected to correct the pixel position as the base point for the image recognition in accordance with the dislocation so that the paper sheet may be discriminated on the basis of the corrected precise base point for the image recognition. As a result, even the paper sheet having the dislocated pattern can be hardly influenced in its discrimination to avoid a drop in the discrimination percentage so that a discriminator having a high discrimination performance (the discrimination percentage/the reliability) can be provided.

What is claimed is:

1. A paper sheet discriminating apparatus for deciding at least the kind of a paper sheet on the basis of the sheet pattern by sampling the image of the sheet whole surface, wherein the improvement resides in that the dislocation of the pattern, as viewed from the contour, is detected on the basis of the marginal length of said paper sheet from the outer periphery to the pattern, thereby to correct a pixel position for providing a base point for the image recognition of said paper sheet, with the detected dislocation.

2. A paper sheet discriminating apparatus according to claim 1, wherein said base point is a center coordinate of said paper sheet.

3. A paper sheet discriminating apparatus according to claim 2, wherein said correction is performed by affine transformation and image turn.

4. A paper sheet discriminating apparatus for discriminating a paper sheet in terms of its pattern by irradiating said paper sheet with a light to receive at least the reflected one of a transmitted light and a reflected light obtained from said paper sheet, comprising:

a contour center coordinate extracting means for determining the center coordinates from the contour of said paper sheet on the basis of image data of said paper sheet; and a marginal length extracting means for extracting the marginal length of the outer periphery of said paper sheet from the contour to the center coordinates, and wherein the difference in the marginal lengths from the contour edges of the individual two sides of said paper sheet in the longitudinal and transverse directions is determined by said marginal length extracting means so that the center coordinates of said pattern may be obtained by correcting the center coordinates from the contour, as determined by said contour center coordinate extracting means, by using said difference.

5. A paper sheet discriminating apparatus according to claim 4, wherein the difference of said marginal lengths is determined at the portion, where the channels at the identical position in the transfer direction and the lines in the transfer transverse direction are identical, to prevent an excessive correction by substituting a predetermined maximum when said difference is not less than a predetermined value, and to determine an average value by excluding the maximum and the minimum of the marginal lengths of a plurality of portions of each side.

6. A paper sheet discriminating apparatus according to claim 4, wherein said marginal length extracting means includes a marginal length counter and compares a content stored in buffer memories with a predetermined threshold value to extract the marginal length at every longitudinal and transverse portions, and said extracted marginal lengths of the individual portions are stored in said marginal length counter.

7. A paper sheet discriminating apparatus according to claim 6 further including a correction value computing means, wherein said correction value computing means determines a dislocation of the pattern on the basis of the marginal length stored in said marginal length counter, and corrects pixel positions providing a basis for the image recognition from the determined dislocation.

8. A paper sheet discriminating apparatus according to claim 7 further including an image blocking means for dividing the area to be discriminated, into a preset number of blocks on the basis of the determined image center coordinates and an oblique information, and determining a sum of the image data of the divided individual blocks.

9. A paper sheet discriminating apparatus according to claim 8 further including a normalization means for normalizing the individual block values by dividing them by the sum of the individual block value blocked by said image blocking means.

10. A paper sheet discriminating method for discriminating a paper sheet in terms of its pattern by irradiating said paper sheet with a light to receive at least the reflected one of a transmitted light and a reflected light obtained from said paper sheet, comprising:

determining the difference between the marginal lengths from the individual two side edges of said paper sheet in the longitudinal and transverse directions, to determine the center coordinates of said pattern by correcting the center coordinates determined from the edges of the individual two sides of said paper sheet with said difference; and determining the difference between said marginal lengths at the portion, where the channels at the identical position in the transfer direction and the lines in the transfer transverse direction are identical, to prevent the excessive correction by substituting a predetermined maximum when said difference is not less than a predetermined value, and to determine an average value by excluding the maximum and the minimum of the marginal lengths of a plurality of portions of each side.

* * * * *